(12) United States Patent
Tanaka et al.

(10) Patent No.: US 7,764,335 B2
(45) Date of Patent: Jul. 27, 2010

(54) LIQUID CRYSTAL MODULE

(75) Inventors: Mitsuru Tanaka, Osaka (JP); Yuto Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 126 days.

(21) Appl. No.: 12/242,978

(22) Filed: Oct. 1, 2008

(65) Prior Publication Data

US 2009/0091688 A1 Apr. 9, 2009

(30) Foreign Application Priority Data

Oct. 4, 2007 (JP) .............................. 2007-260542

(51) Int. Cl.
*G02F 1/1335* (2006.01)
*F21V 7/04* (2006.01)
(52) U.S. Cl. .............................. 349/65; 349/56; 349/58; 349/61; 349/62; 362/609; 362/610; 362/97.2
(58) Field of Classification Search .................. 349/56, 349/58, 61, 62, 67, 69, 70, 113, 112, 65; 369/609, 610, 618, 97.1, 97.2, 97.3, 97.4
See application file for complete search history.

(56) References Cited

U.S. PATENT DOCUMENTS

| | | | |
|---|---|---|---|
| 7,011,441 B2 * | 3/2006 | Shimojoh | 362/624 |
| 7,561,225 B2 * | 7/2009 | Nakagawa et al. | 349/60 |
| 2003/0043312 A1 | 3/2003 | Nishida et al. | |
| 2008/0198627 A1 * | 8/2008 | Matsumoto | 362/633 |
| 2009/0091688 A1 * | 4/2009 | Tanaka et al. | 349/65 |
| 2009/0256989 A1 * | 10/2009 | Lee et al. | 349/58 |

FOREIGN PATENT DOCUMENTS

| | | |
|---|---|---|
| JP | 09-015594 A | 1/1997 |
| JP | 09-152577 A | 6/1997 |
| JP | 2000-19512 A | 1/2000 |
| JP | 2006-196409 A | 7/2006 |
| JP | 2007-207457 A | 8/2007 |

* cited by examiner

*Primary Examiner*—Brian M Healy
(74) *Attorney, Agent, or Firm*—Global IP Counselors, LLP

(57) ABSTRACT

A liquid crystal module includes a liquid crystal panel, a lamp unit, a light guide plate, a rear frame and a light reflecting sheet. The lamp unit is configured to emit light. The light guide plate is configured to guide the light emitted by the lamp unit, and has a peripheral face. The rear frame is disposed rearward of the light guide plate, and has a facing portion facing a part of the peripheral face of the light guide plate. The light reflecting sheet is disposed between the light guide plate and the rear frame, and has a tab portion that is sandwiched between the part of the peripheral face of the light guide plate and the facing portion of the rear frame.

4 Claims, 4 Drawing Sheets

LIQUID CRYSTAL MODULE

CROSS-REFERENCE TO RELATED APPLICATIONS

This application claims priority to Japanese Patent Application No. 2007-260542 filed on Oct. 4, 2007. The entire disclosure of Japanese Patent Application No. 2007-260542 is hereby incorporated herein by reference.

BACKGROUND OF THE INVENTION

1. Field of the Invention

The present invention generally relates to a liquid crystal module. More specifically, the present invention relates to a liquid crystal module having a light guide plate.

2. Background Information

A conventional liquid crystal module having an edge-lighting type of backlight unit basically includes a light reflecting sheet, a light guide plate, a rear frame, a cold cathode tube, a lamp reflector, a plastic frame, an optical sheet, a liquid crystal panel and a bezel. The light reflecting sheet and the light guide plate are superposed one over the other on the rear frame. The cold cathode tube and the lamp reflector are disposed along an end face of the light guide plate. The light reflecting sheet, the light guide plate, the cold cathode tube and the lamp reflector are surrounded by the plastic frame. The optical sheet and the liquid crystal panel are superposed one over the other on the plastic frame. A peripheral edge of the liquid crystal panel is held down by the bezel. Positioning convex components are integrally formed on left and right side faces of the light guide plate. A pair of positioning tabs is formed on each of the left and right side edges of the rear frame. The positioning tabs contact with end faces of the positioning convex components of the light guide plate. Then, the light guide plate is positioned with respect to the rear frame.

Meanwhile, there has been proposed another liquid crystal display device equipped with an edge-lighting type of backlight (see Japanese Laid-Open Patent Application Publication No. 2006-196409, for example). The liquid crystal display device includes protrusions in the form of a prong, a curved edge, a double prong, or the like on an opposite end portion of side edges of a light guide plate that is opposite from an end portion where the light comes in. The protrusions of the light guide plate are fitted into recesses in an inner face of a panel chassis to support and fix the light guide plate.

There has also been proposed another liquid crystal display device equipped with a liquid crystal display panel and a backlight (see Japanese Laid-Open Patent Application Publication No. H9-152577, for example). The backlight has a light guide plate, a light source disposed on a side face of the light guide plate and a support frame for fixing the light guide plate and the light source. At least one protrusion is formed at the center of gravity of the light guide plate. The protrusion is fitted into a concave component of the support frame.

There has further been proposed another liquid crystal display device having a liquid crystal display panel, a housing that supports the liquid crystal display panel and an edge-lighted backlight type of light guide plate disposed on a rear face of the liquid crystal display panel (see Japanese Laid-Open Patent Application Publication No. H9-15594, for example). Convex components are formed on side faces of the light guide plate. The convex components are engaged and slid into substantially L-shaped cut-outs formed in the housing. An end face of the light guide plate on an opposite side from a side where a linear light source is disposed is inserted into a substantially U-shaped groove formed in the housing to mount the light guide plate to the housing.

There has also been proposed another liquid crystal display device equipped with a backlight device (see Japanese Laid-Open Patent Application Publication No. 2000-19512, for example). The backlight device includes a light guide plate, a lamp unit, a reflector, a reflective sheet mounted to a rear face side of the light guide plate, a plurality of optical sheets laminated on a light irradiation side of the light guide plate, a housing that accommodates the constituent members and a frame supporting the above-mentioned constituent members between the housing and the frame. A mating hole for positioning and supporting the optical sheets is formed in a side wall of the housing. A mating convex component provided to at least the optical sheet adjacent to the housing is mated with the mating hole in the housing to position and support the optical sheets.

However, with the conventional liquid crystal display module and the conventional liquid crystal display device, it is required to reduce light leakage from the light guide plate.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal module with which light leakage from the light guide plate can be reduced.

In accordance with one aspect of the present invention, a liquid crystal module includes a liquid crystal panel, a lamp unit, a light guide plate, a rear frame and a light reflecting sheet. The lamp unit is configured to emit light. The light guide plate is configured to guide the light emitted by the lamp unit, and has a peripheral face. The rear frame is disposed rearward of the light guide plate, and has a facing portion facing a part of the peripheral face of the light guide plate. The light reflecting sheet is disposed between the light guide plate and the rear frame, and has a tab portion that is sandwiched between the part of the peripheral face of the light guide plate and the facing portion of the rear frame.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
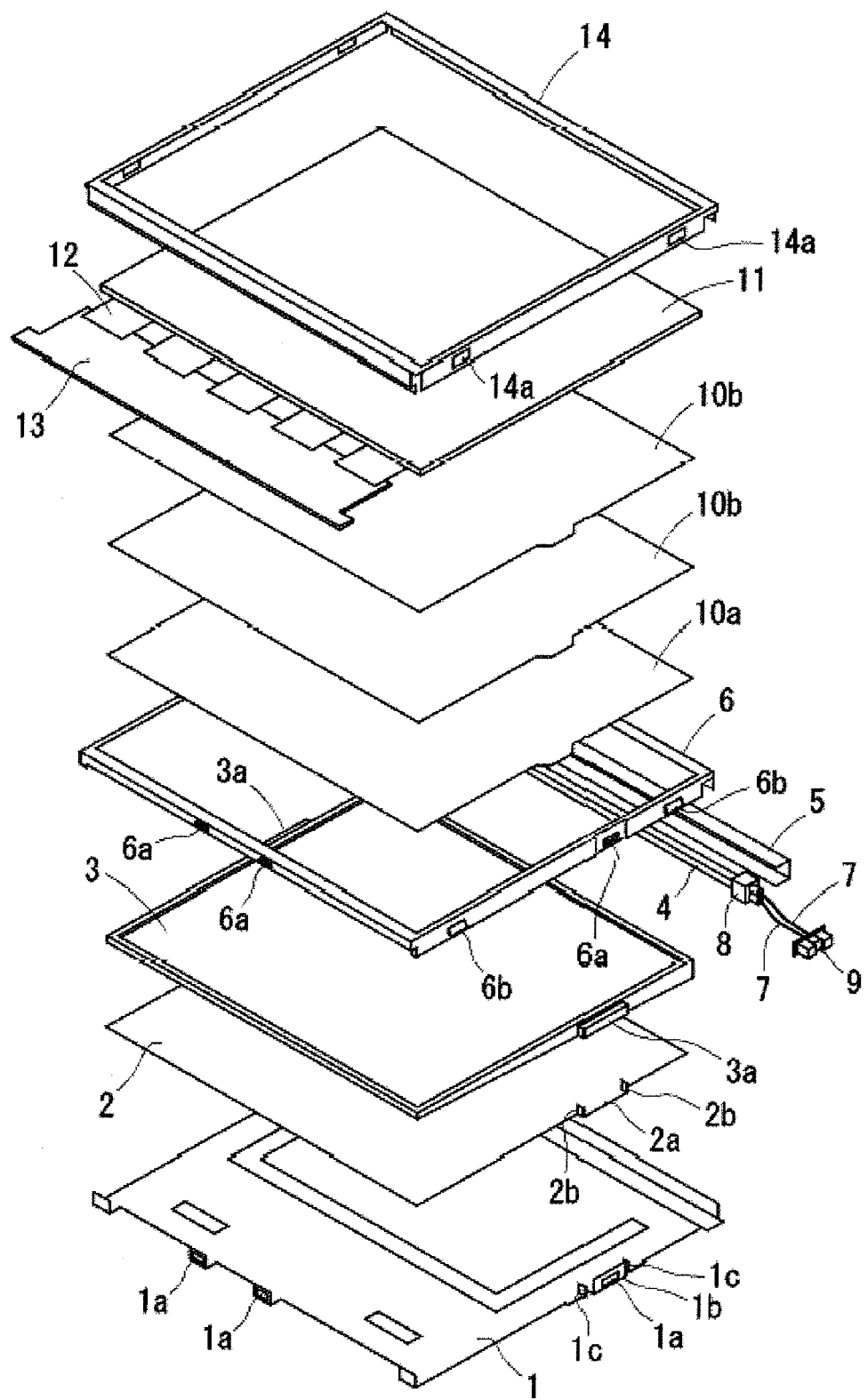
FIG. 1 is an exploded perspective view of a liquid crystal module in accordance with one embodiment of the present invention.
Figure 2:
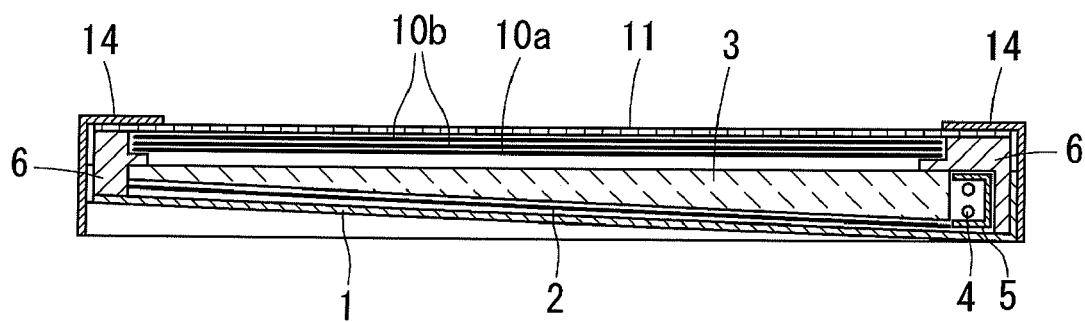
FIG. 2 is a simplified vertical cross sectional view of the liquid crystal module illustrated in FIG. 1.
Figure 3:
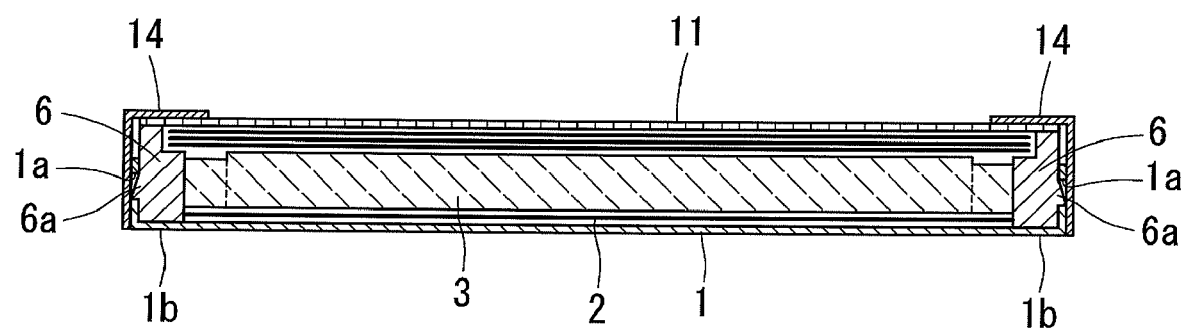
FIG. 3 is a simplified lateral cross sectional view of the liquid crystal module illustrated in FIG. 1.

As shown in FIGS. 1 to 3, a liquid crystal module includes a rear frame 1, a light reflecting sheet 2, a light guide plate 3, a cold cathode tube 4, a lamp reflector 5, a plastic frame (e.g., front frame) 6, a pair of lead wires 7, a lamp socket 8, a connector 9, an optical sheet, a liquid crystal panel (liquid crystal cell) 11, a plurality of COFs (chips on film) 12, a printed wiring board 13 and a bezel 14. The rear frame 1 is made of metal sheet. The rear frame 1 is disposed rearward of the light guide plate 3. The light guide plate 3 is formed in a wedge-shape. The guide plate 3 guides light emitted by the cold cathode tube 4. The light reflecting sheet 2 and the light guide plate 3 are superposed one over the other on the rear frame 1. The lamp reflector 5 has a U-shaped cross section. The lamp reflector 5 reflects the light emitted by the cold cathode tube 4. The cold cathode tube 4 and the lamp reflector 5 are disposed along an end face (e.g., lower side face) of a thicker side of the light guide plate 3. The plastic frame 6 is made of white resin and formed in a square shape. The light reflecting sheet 2, the light guide plate 3, the cold cathode tube 4 and the lamp reflector 5 are surrounded and held on the rear frame 1 by the plastic frame 6. The plastic frame 6 includes a plurality of engagement prongs 6a formed on side faces of the plastic frame 6. The engagement prongs 6a are engaged with a plurality of corresponding engagement holes 1a formed in the rear frame 1. As a result, the plastic frame 6 is integrally attached to the rear frame 1 so as not to come off. Also, the cold cathode tube 4 and the lamp reflector 5 are removably and insertably attached to an inner side of the liquid crystal module. As a result, the cold cathode tube 4 can be replaced by a simple operation.

The lead wires 7 are soldered to terminals of the cold cathode tube 4 to form connected portions. The lamp socket 8 is made of a silicone rubber. The lamp socket 8 is attached to an end portion of the cold cathode tube 4 to cover the connected portions. The connector 9 is attached to distal ends of the lead wires 7. As a result, the cold cathode tube 4 can be easy connected to a main printed wiring board (not shown). The cold cathode tube 4, the lamp reflector 5, the lead wires 7, the lamp socket 8 and the connector 9 form a lamp unit that emit light to the light guide plate 3.

The optical sheet includes a light diffusion sheet 10a and two prism sheets 10b. The optical sheet is disposed between the light guide plate 3 and the liquid crystal panel 11. The light diffusion sheet 10a and the prism sheets 10b are superposed one over the other over the plastic frame 6. The liquid crystal panel 11 is disposed over the optical sheet. The liquid crystal panel 11 is linked to the printed wiring board 13 via the COFs 12. The COFs 12 includes driver IC chips. A peripheral edge of the liquid crystal panel 11 is held down and fixed by the bezel 14 having a square shape. The bezel 14 includes a plurality of engagement holes 14a formed on side faces of the bezel 14. The engagement holes 14a are engaged with corresponding engagement prongs 6b of the plastic frame 6. As a result, the bezel 14 is integrally attached to the plastic frame 6 so as not to come off.

Figure 4:
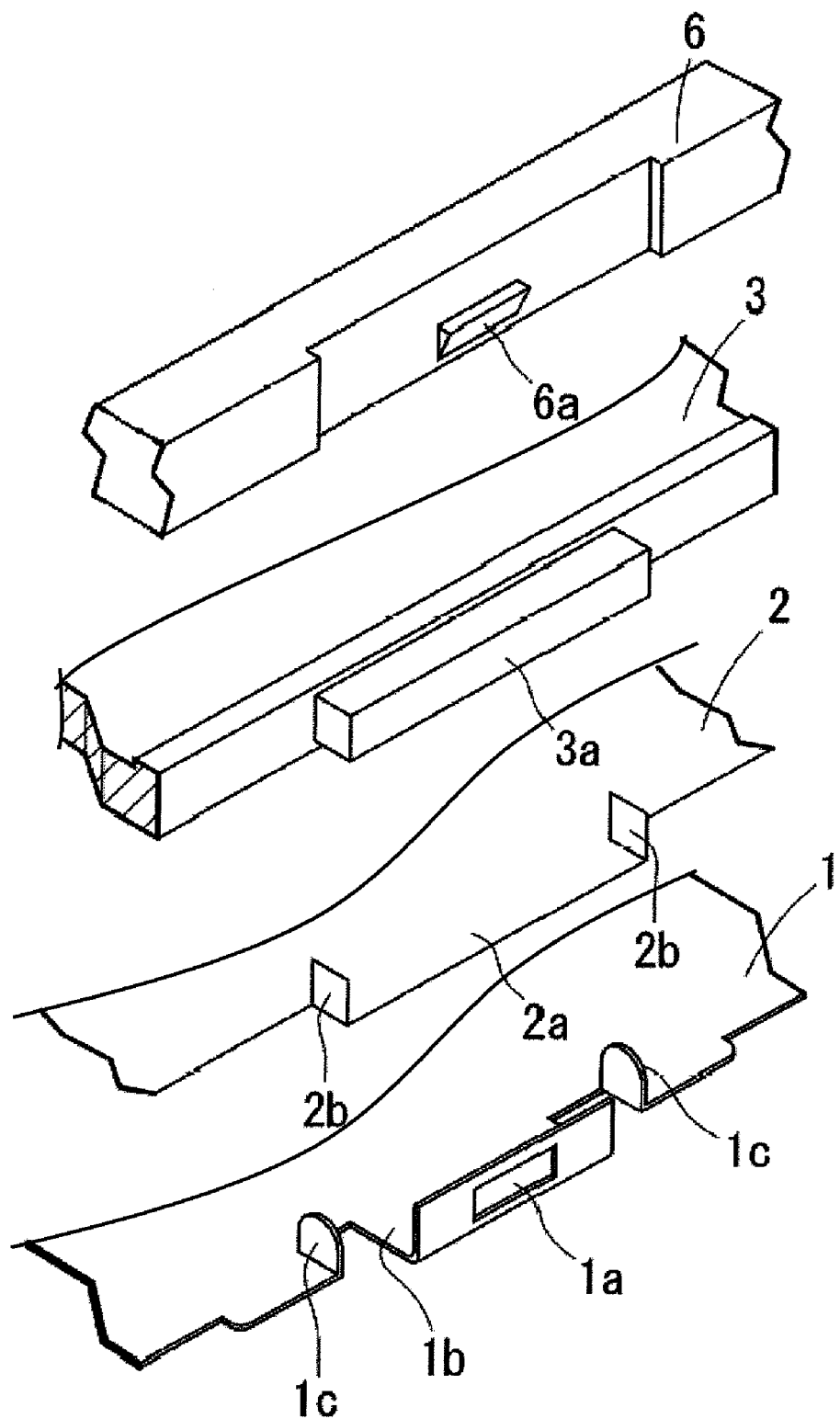
FIG. 4 is a detailed exploded perspective view of a main components of the liquid crystal module illustrated in FIG. 1.
Figure 5:
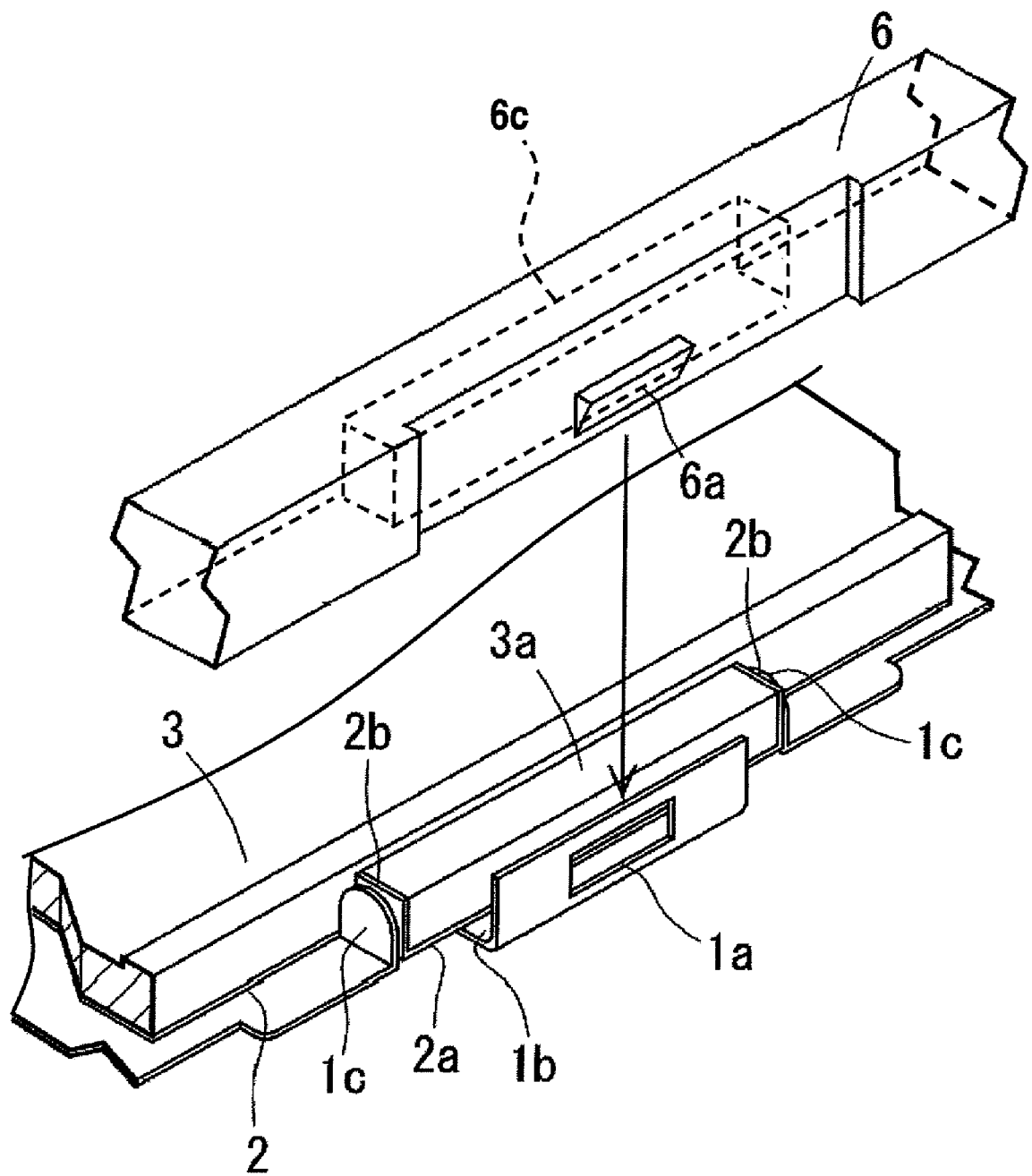
FIG. 5 is a detailed exploded perspective view of the main components of the liquid crystal module illustrated in FIG. 1.

As shown in FIGS. 1, 4, and 5, the light guide plate 3 includes a pair of positioning convex components (e.g., positioning portion) 3a. Each of the positioning convex components 3a has a slender, cuboid shape and protrudes from each of left and right side faces (e.g., lateral side face) of the light guide plate 3. Each of the positioning convex components 3a includes end faces (e.g., a part of the peripheral face) facing upward and downward, respectively, rear faces facing rearward and distal end face facing to a lateral direction. The rear frame 1 includes L-shaped support tabs (e.g., extension portion) 1b protruding from left and right side ends of the rear frame 1, respectively. The support tabs 1b support the positioning convex components 3a. Specifically, the support tabs 1b face the rear faces and the distal end faces of the positioning convex components 3a. The protruding distance of the support tabs 1b is greater by the thickness of the plastic frame 6, which is sandwiched between the support tabs 1b and the positioning convex components 3a, than the protruding distance of the distal end faces of the positioning convex components 3a. The engagement holes 1a that engage with the engagement prongs 6a of the plastic frame 6 are formed in rising parts formed at the distal ends of the support tabs 1b. The rear frame 1 further includes two pairs of positioning tabs (e.g., facing portions, positioning tabs or upper and lower positioning tabs) 1c formed at the left and right side ends of the rear frame 1, respectively. The positioning tabs 1c position the light guide plate 3 by contacting with the end faces of the positioning convex components 3a. The positioning tabs 1c are formed by bending the rear frame 1 upward (frontward) at both upper and lower sides of the support tabs 1b of the rear frame 1. In other words, the positioning tabs 1c extend frontward from a rear plate of the rear frame 1.

Meanwhile, the light reflecting sheet 2 includes protruding tabs 2a and insertion tabs (e.g., tab portions or upper and lower tab portions) 2b. The light reflecting sheet 2 is integrally formed as a one-piece, unitary member. The protruding tabs 2a cover the rear faces of the positioning convex components 3a of the light guide plate 3. The protruding tabs 2a are formed at left and right side ends of the light reflecting sheet 2. The insertion tabs 2b are formed by bending the light reflecting sheet 2 upward (frontward) at ends of the protruding tabs 2a. In other wards, the insertion tabs 2b extend frontward from the ends of the protruding tabs 2a. The rear face of the positioning convex components 3a is covered by the protruding tabs 2a when the light reflecting sheet 2 is superposed over the rear face of the light guide plate 3. The insertion tabs 2b are disposed along the end faces of the positioning convex components 3a. The positioning convex components 3a are fitted along with the insertion tabs 2b between the positioning tabs 1c. As a result, as shown in FIG. 5, the insertion tabs 2b of the light reflecting sheet 2 are inserted between the positioning convex components 3a of the light guide plate 3 and the positioning tabs 1c of the rear frame 1. In other words, the insertion tabs 2b are sandwiched between the end faces of the positioning convex components 3a of the light guide plate 3 and the positioning tabs 1c of the rear frame 1.

Further, as shown in FIG. 5, part of the white plastic frame 6 is fitted in between the rising part of the support tabs 1b of the rear frame 1 and the positioning convex components 3a of the light guide plate 3. The distal end faces of the positioning convex components 3a are covered by the part of the plastic frame 6. Specifically, the plastic frame 6 includes concave portions 6c formed on left and right inner side face of the plastic frame 6. The concave portions 6c house the positioning convex components 3a, the insertion tabs 2b and the positioning tabs 1c. The engagement prongs 6a formed on the plastic frame 6 engage with the engagement holes 1a formed in the rising part of the support tabs 1*b*. As a result, the plastic frame 6 is fixedly attached with the rear frame 1.

With the liquid crystal module, the insertion tabs 2*b* of the light reflecting sheet 2 are inserted into the contact portions (facing portions) of the positioning tabs 1*c* of the rear frame 1 and the positioning convex components 3*a* of the light guide plate 3. The insertion tabs 2*b* of the light reflecting sheet 2 reflect any light guided to the end faces of the light guide plate 3. Thus, light leakage from the contact portions of the positioning tabs 1*c* of the rear frame and the positioning convex components 3*a* of the light guide plate 3 can be prevented. Furthermore, damage to the end faces (contact faces) of the positioning convex components 3*a* by the metal rear frame 1 can also be prevented by the insertion tabs 2*b*. The light leakage can also be prevented by using an adhesive agent to bond tab portions of a light reflecting sheet to the end faces of the positioning convex component 3*a*. However, with the insertion tabs 2*b*, the work of bonding tab portions to the end faces of the positioning convex component 3*a* is no longer necessary. In other words, since the insertion tabs 2*b* can be simply inserted by the above-mentioned process, assembly work efficiency can be greatly increased and cost reduced.

In addition, the rear faces of the positioning convex components 3*a* of the light guide plate 3 are covered by the protruding tabs 2*a* of the light reflecting sheet 2. Therefore, light leakage can also be prevented from the rear faces of the positioning convex components 3*a*. As a result, optical loss can be further reduced. Furthermore, the distal end faces of the positioning convex components 3*a* are covered by the part of the white plastic frame 6. Therefore, light leakage can also be prevented from the distal end faces of the positioning convex components 3*a*. Furthermore, optical loss can be further reduced by the light reflecting action of the white plastic frame 6.

The liquid crystal module of the present invention is described above by using as an example a case in which the insertion tabs 2*b* of the light reflecting sheet 2 are inserted between the positioning convex components 3*a* of the light guide plate 3 and the positioning tabs 1*c* of the rear frame 1. However, the present invention is not limited to just this embodiment. For example, insertion tabs of the light reflecting sheet can be inserted between any contact portions of the rear frame and the light guide plate of different shapes. Also, in the above embodiment, the liquid crystal module includes the wedge-shaped light guide plate 3, and the cold cathode tube 4 and the lamp reflector 5 are disposed along the end face on the thick side of the light guide plate 3. However, it should go without saying that a flat light guide plate of uniform thickness can be employed instead, and the cold cathode tube and lamp reflector disposed on both end faces thereof.

The present invention is favorable for liquid crystal display devices, and in particular is favorable for liquid crystal display devices in which the cold cathode lamp can be replaced. Furthermore, the liquid crystal display module can be installed in a small television set, a car navigation system, a personal computer, or another such electronic device.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
   a liquid crystal panel;
   a lamp unit configured to emit light;
   a light guide plate configured to guide the light emitted by the lamp unit, and the light guide plate having a positioning portion that protrude from a lateral side face of the light guide plate;
   a rear frame disposed rearward of the light guide plate, and the rear frame having upper and lower positioning tabs that face upper and lower end faces of the positioning portion of the light guide plate, respectively, to position the light guide plate with respect to the rear frame; and
   a light reflecting sheet disposed between the light guide plate and the rear frame, and the light reflecting sheet having
      an extension portion that is disposed on a rear side of the positioning portion of the light guide plate, and
      upper and lower tab portions that extend frontward from the extension portion of the light reflecting sheet,
      the upper and lower tab portions being sandwiched between the upper and lower positioning tabs of the rear frame and the upper and lower end faces of the positioning portion of the light guide plate, respectively.

2. The liquid crystal module according to claim 1, further comprising
   an optical sheet disposed between the light guide plate and the liquid crystal panel; and
   a front frame holding the lamp unit, the light guide plate and the light reflecting sheet on the rear frame.

3. The liquid crystal module according to claim 2, wherein the lamp unit has a cold cathode tube configured to emit light and a lamp reflector configured to reflect the light emitted by the cold cathode tube, and is disposed along a lower side face of the light guide plate.

4. The liquid crystal module according to claim 1, wherein the front frame is made of white resin, and covers the lateral side face of the positioning portion of the light guide plate.

* * * * *